United States Patent [19]
Johnson et al.

[11] Patent Number: 5,130,800
[45] Date of Patent: Jul. 14, 1992

[54] PICTURE OUT OF PICTURE FEATURE FOR WIDE-SCREEN DISPLAY

[75] Inventors: Larry D. Johnson, Knoxville; Stephen T. Troemel, Jefferson City; Cuong V. Luu, Knoxville, all of Tenn.

[73] Assignee: North American Philips Corporation, New York, N.Y.

[21] Appl. No.: 458,115

[22] Filed: Dec. 28, 1989

[51] Int. Cl.5 .................... H04N 5/265; H04N 5/260; H04N 5/45
[52] U.S. Cl. ........................................ 358/183; 358/22
[58] Field of Search ............................ 358/183, 22, 140

[56] References Cited

U.S. PATENT DOCUMENTS

| | | | |
|---|---|---|---|
| 4,965,669 | 10/1990 | Canfield et al. | 358/183 |
| 5,065,243 | 11/1991 | Katagiri | 358/183 |

FOREIGN PATENT DOCUMENTS

| | | |
|---|---|---|
| 61-95683 | 5/1986 | Japan . |
| 62-84665 | 4/1987 | Japan . |
| 62-154884 | 7/1987 | Japan . |
| 63-146671 | 6/1988 | Japan . |
| 1221067 | 9/1989 | Japan . |

OTHER PUBLICATIONS

Japanese Patent Abstract 63-200681, Aug. 18, 1988. Only the abstract of this reference was submitted.
A Glimpse Into Future Television, Joseph S. Nadan, Jan. 1985, Byte pp. 135–150.

*Primary Examiner*—James J. Groody
*Assistant Examiner*—Glenton B. Burgess
*Attorney, Agent, or Firm*—Edward W. Goodman

[57] ABSTRACT

A circuit for horizontally displaying a first standard aspect-ratio television picture and a reduced-size second standard aspect-ratio television picture on a wide aspect-ratio television display includes a first and a second video signal supply and a circuit for selecting one of the video signals as the first standard aspect-ratio television picture and the other of the video signals as the second standard aspect-ratio television picture. The video signal for the first standard aspect-ratio television picture is then time compressed while the video signal for the second standard aspect-ratio television picture is initially sub-sampled to reduce the size of the resulting television picture and is then time compressed. These two compressed video signals are then selectively applied to the wide aspect-ratio television display so that the reduced-size second standard aspect-ratio television picture appears beside the first standard aspect-ratio television picture.

5 Claims, 3 Drawing Sheets

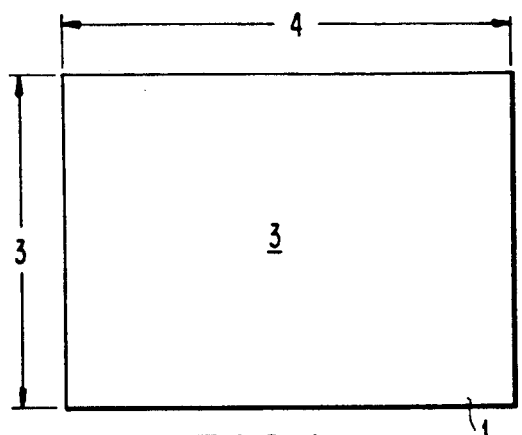
FIG.1a
PRIOR ART
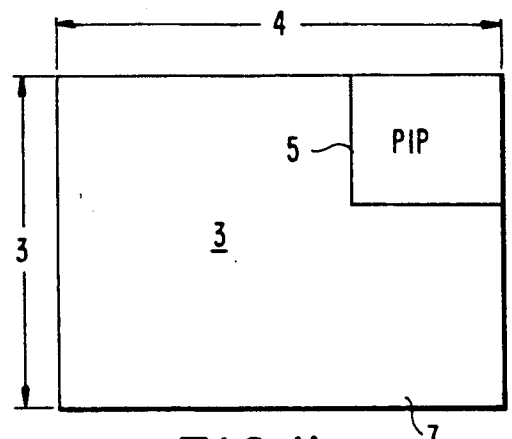
FIG.1b
PRIOR ART
FIG.2a
PRIOR ART
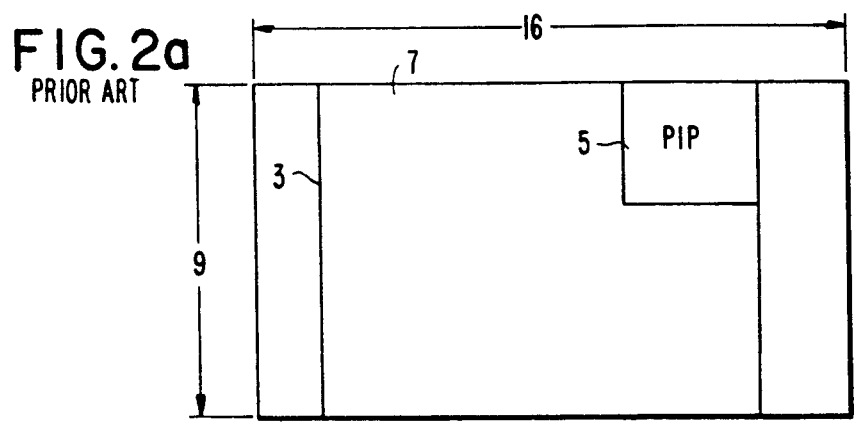
FIG.2b
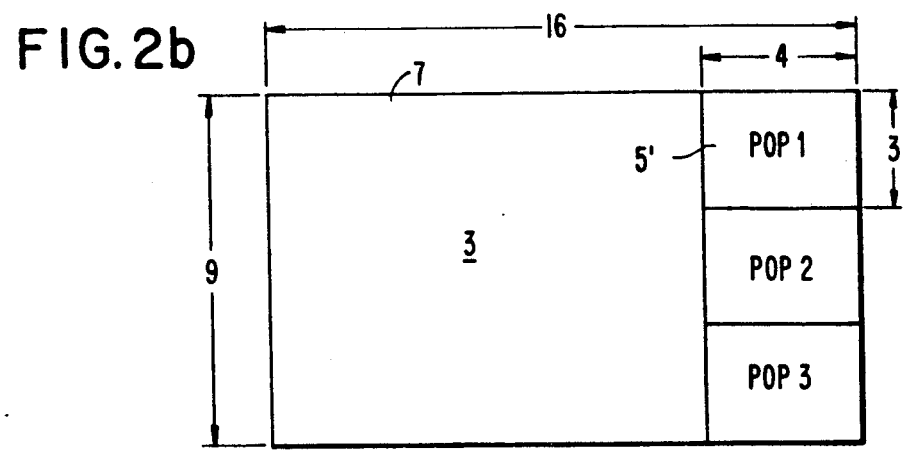

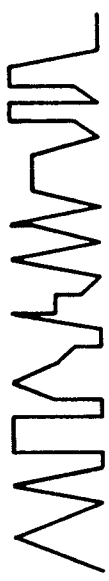
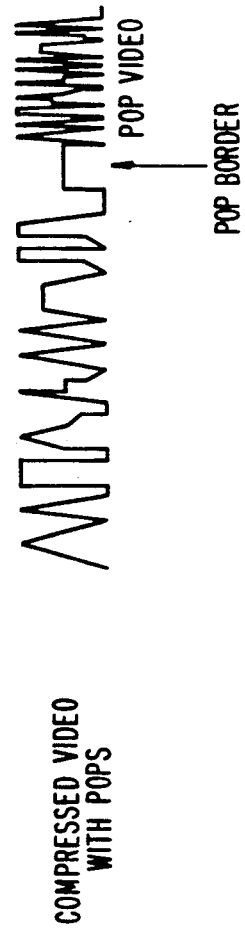
FIG.3a STANDARD BLANKING
FIG.3b VIDEO SIGNAL
FIG.3c VIDEO SIGNAL WITH PIPS — PIP VIDEO
FIG.3d DELAYED BLANKING
FIG.3e COMPRESSED VIDEO WITH POPS — POP VIDEO, POP BORDER

PICTURE OUT OF PICTURE FEATURE FOR WIDE-SCREEN DISPLAY

BACKGROUND OF THE INVENTION

1. Field of the Invention

The subject invention is related to the picture-in-picture (PIP) feature for a television display.

2. Description of Related Art

Currently, digital television sets with PIP have been developed. These sets superimpose scaled-down 4:3 aspect ratio images over a main full screen video picture allowing the user to view multiple programs simultaneously. However, due to the superimposition, portions of the main video picture information are lost at the locations of the PIP images.

As the broadcast and television industry moves toward the development of a high definition television (HDTV) standard, a new picture size aspect ratio of 16:9 has become the preferred size for wide-screen and HDTV. In order to be compatible with standard NTSC programming material, any wide-screen hardware must be capable of displaying 4:3 aspect ratio video on the wider 16:9 screens. Given that the picture height is the same for both aspect ratios, then:

$$(16/9)/(4/3) = 1.33$$

Thus, the wide-screen format has 33% more picture width than the conventional 4:3 format. Conversely, when a 4:3 video image is displayed on the wide-screen display, 25% of the available viewing area (typically, the width) will remain unused.

Co-pending U.S. patent application Ser. No. 07/304,736, filed Jan. 31, 1989, to Guerinot et al. and assigned to the assignee of the subject application, discloses a method and apparatus for dithering a 4:3 aspect ratio picture on a 16:9 aspect ratio display to prevent uneven phosphor burn-in. However, the above-noted 25% of the viewing area remains unused.

SUMMARY OF THE INVENTION

It is an object of the present invention to provide an apparatus for use with a wide-screen display capable of giving the advantages of PIP, i.e. multiple picture presentation, while eliminating the disadvantages of PIP, i.e. the loss of video information in the main picture.

The above object is achieved in a circuit for interfacing with a standard digital television chassis having PIP capability, said circuit removing the PIP images from the display field of the main, standard aspect ratio picture and vertically displaying up to three picture-out-of-picture (POP) images on the right or left side of the main picture outside of the display field of the main picture. As a result, there is no loss of video information in the main picture.

BRIEF DESCRIPTION OF THE DRAWINGS

With the above and additional objects and advantages in mind as will hereinafter appear, the subject invention will be described with reference to the accompanying drawings, in which:

FIG. 1a shows a standard aspect ratio display, while FIG. 1b shows the display of FIG. 1a with a PIP image superimposed therein;

FIG. 2a shows a wide-screen display with the standard aspect ratio image/PIP image centered therein, while FIG. 2b shows the wide-screen display with the standard aspect ratio image positioned to the left on the display and three vertically arranged picture-out-of-picture (POP) images positioned to the right on the display;

FIGS. 3a–3e show timing diagrams of the various video signals;

DESCRIPTION OF THE PREFERRED EMBODIMENT

Figure 4:
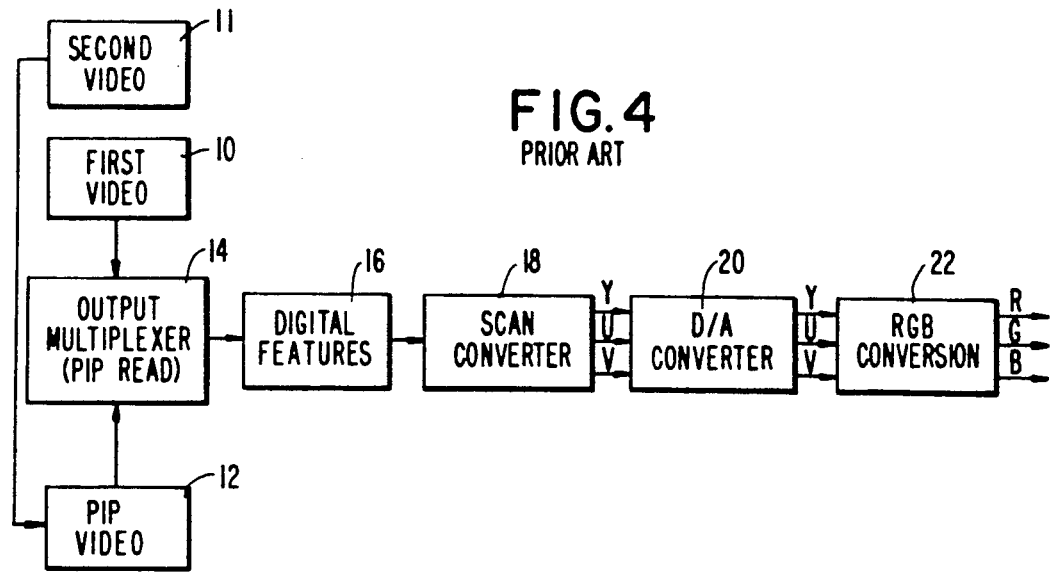
FIG. 4 shows a block diagram of the video data path of a television receiver having the PIP feature.

FIG. 1a shows a standard aspect ratio display 1 with a main picture image 3 thereon. As depicted in FIG. 1b, in order to show a PIP image 5, a portion of the video information of the main picture image 3 is lost due to the superimposition of the PIP image 5.

FIG. 2a shows the main picture image 3 with the superimposed PIP image 5 of FIG. 1b displayed on a wide-screen display 7. It should be apparent that 25% of the potential display area of the wide-screen display 7 is unused (note the blank panels on opposite sides of the main picture image 3).

The subject invention makes use of this unused area by, in essence, moving the main picture image 3 to the left (or right) and by moving the PIP image 5 out of the display field of the main picture image 3 and into the unused area now located to the right (or left) of the main picture image 3, as shown in FIG. 2b. as such, the complete main picture image 3 is visible to the viewer along with the PIP image 5, which applicants now designate as the picture-out-of-picture (POP) image 5'. This also allows the vertical arranging of three POP images 5' without detracting from the picture information being displayed for the main picture image 3.

FIGS. 3a–3e show various video line signals for generating the displays described above. In particular, FIG. 3a shows standard line blanking pulses while FIG. 3b shows one line of the main video signal used to generate the display of FIG. 1a. FIG. 3c shows the main video line signal of FIG. 3b in which a portion of the signal is replaced by a PIP video line signal for generating the display of FIG. 1b. It should be apparent that the replaced portion of the main video line signal is lost and is not viewable. FIG. 3d shows the delayed line blanking pulses of the wide-screen display. As indicated in the above-noted co-pending application, without considering HDTV, since the line duration of the wide-screen display is the same as that for a standard aspect ratio display, in order to display a standard aspect ratio image on the wide-screen display, it is necessary to compress the standard aspect ratio image, along with any desired PIP images, with respect to time. Hence, the video line signal of FIG. 3c is compressed with respect to time leaving 25% of the potential line width unused. Finally, FIG. 3e shows the video line signal for generating the display shown in FIG. 2b. It should be noted that this signal is similar to that shown in FIG. 3c with the exception that the signal is compressed and the PIP video line signal is removed from overlaying the main video line signal thereby enabling the viewer to see all of the picture information in the main video line signal.

FIG. 4 shows a functional block diagram of a standard PIP television receiver. Two video sources (or tuners or a combination of both) 10 and 11 are needed for PIP displays; one for the main picture image 3 and the other for the PIP images 5. In the case of PIP, the video source 11 is connected to the input of PIP video processor 12 which contains circuitry for horizontal and vertical sub-sampling and storage of the PIP signal. The outputs from both source 10 and PIP video processor 12 are applied to a multiplexer 14 which by appropriately switching between the source 10 and the processor 12, forms the standard aspect ratio main picture image 3 with PIP 5 for display on the wide-screen display 7. This composite video signal passes through a digital feature circuit 16 for functions such as picture freeze, noise reduction etc. A scan converter 18 in series with the digital feature circuit 16 includes memories for speeding up the data rate of the luminance and chrominance components Y, U and V of the video signal. The data rate is modified to achieve the correct aspect ratio of 4:3 for the main and PIP picture images 3 and 5 since the scan circuitry of the wide-screen display 7 expects a 16:9 aspect ratio signal. Without this scan conversion, the displaying of the video signal would appear compressed vertically since the image would be stretched by 33% in the horizontal direction. Increasing the data rate compresses the video signal into a shorter time period thereby narrowing the width of the main picture image 3.

After being converted to analog signals by a D/A converter 20, an RGB processor 22 converts the luminance and chrominance components Y, U and V into Red, Green and Blue color signals for application to the display.

Figure 5:
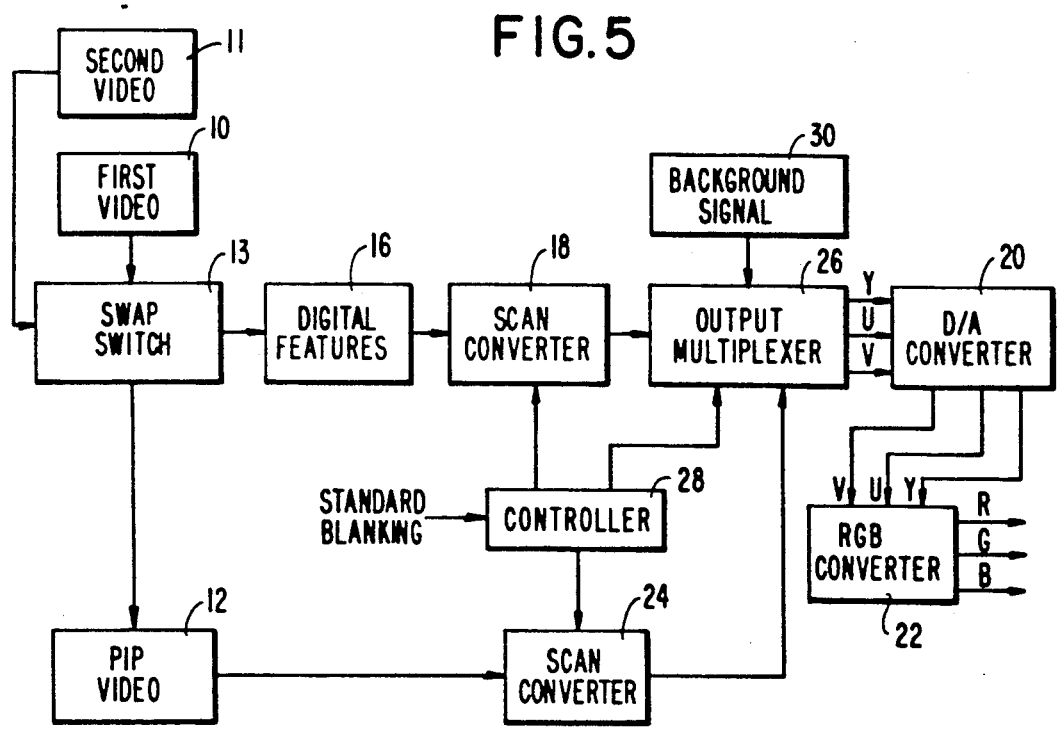
FIG. 5 shows a block diagram of the system according to the subject invention.

FIG. 5 shows modifications to the block diagram of FIG. 4 to achieve the POP display of the subject invention. The first video source 10 and the second video source 11 apply respective video signals to swap switch 13 which selectively applies one of these signals to the digital feature circuit 16 as the main video signal, while applying the other of these signals to the PIP video processor 12. The output from the PIP video processor 12 is applied to a second scan converter 24 which is similar to the scan converter 18. An output multiplexer 26 is then inserted between the scan converter 18 and the D/A converter 20. The output multiplexer 26 also receives the output signals from the scan converter 24. Under the control of a controller 28, which receives the standard line blanking signals, the output multiplexer 26 selectively applies the signals of the main picture 3 from the scan converter 18 and the signals of the now POP images 5' from the scan converter 24 to the D/A converter 20.

As an alternative to the above, the method of inserting the POP images may instead by analog Y, U, V or analog R, G, B wherein the PIP scan converted output and the main picture scan converted output would be applied to separate D/A converters.

In the event that the POP feature is not selected by the user or if only one POP image 5' is being viewed, it may be desired to fill the unused area of the display with a particular color or graphic pattern. For this purpose, a background signal generator 30 is connected to a third selection input of the output multiplexer 26.

It should be understood that while the above description contemplates the displaying of up to three POP images 5' alongside a main picture image, it is within the scope of the present invention to display more than three POP images, for example four ¼-size POP images, by simply modifying the sub-sampling performed in the PIP video source 12.

Numerous alterations of the structure herein disclosed will suggest themselves to those skilled in the art. However, it is to be understood that the embodiment herein described is for purposes of illustration only and is not to be construed as a limitation of the invention. All such modifications which do not depart from the spirit of the invention are intended to be included within the scope of the appended claims.

What is claimed is:

1. A circuit for horizontally displaying a first standard aspect-ratio television picture and a reduced-size second standard aspect-ratio television picture, side-by-side, on a wide aspect-ratio television display, comprising:

means for supplying a first video signal for forming on said wide aspect-ratio television display one of said first and reduced-size second standard aspect-ratio television pictures;

means for supplying a second video signal for forming on said wide aspect-ratio television display the other of said first and reduced-size second standard aspect-ratio television pictures;

means coupled to said two supplying means for selecting one of said first and second video signals for forming said first standard aspect-ratio television picture, the other of said first and reduced-size second video signals forming said second standard aspect-ratio television picture;

means coupled to said selecting means for time compressing said one of said first and second video signals;

means coupled to said selecting means for horizontally and vertically sub-sampling the other of said video signals;

means coupled to said sub-sampling means for time compressing said sub-sampled video signal; and multiplexing means coupled to both time compressing means for selectively applying said selected video signal and said sub-sampled video signal to said wide-aspect ratio television display, whereby said first standard aspect ratio television picture and said reduced-sized second standard aspect ratio television picture are displayed side-by-side on said wide aspect-ratio television display.

2. A circuit as set forth in claim 1, wherein said sub-sampling means reduces by ¼ the horizontal and vertical size of the television picture to be formed by the other of said video signals thereby forming said reduced-size second standard aspect-ratio television picture.

3. A circuit as set forth in claim 2, wherein said standard aspect ratio is 4:3 while said wide aspect ratio is 16:9.

4. A circuit as set forth in claim 3, wherein each of said time compressing means comprises a scan conversion circuit for increasing the data rate of the video signal applied thereto.

5. A circuit as set forth in claim 2, wherein said other of said first and second video signals forms three vertically arranged reduced-size second standard aspect-ratio television pictures beside said first standard aspect-ratio television picture.

* * * * *